(12) United States Patent
Furukawa et al.

(10) Patent No.: US 6,735,544 B2
(45) Date of Patent: May 11, 2004

(54) SYSTEM AND METHOD FOR PREDICTING RADIO WAVE PROPAGATION CHARACTERISTICS

(75) Inventors: Hiroshi Furukawa, Tokyo (JP); Yoshinori Watanabe, Tokyo (JP)

(73) Assignee: NEC Corporation, Tokyo (JP)

( * ) Notice: Subject to any disclaimer, the term of this patent is extended or adjusted under 35 U.S.C. 154(b) by 253 days.

(21) Appl. No.: 10/067,394

(22) Filed: Feb. 7, 2002

(65) Prior Publication Data

US 2002/0107663 A1 Aug. 8, 2002

(30) Foreign Application Priority Data

Feb. 7, 2001 (JP) ......................... 2001-030315

(51) Int. Cl.[7] ........................ G06F 19/00; H04B 17/00
(52) U.S. Cl. ...................... 702/124; 455/676
(58) Field of Search ............... 702/124, 150, 702/152, 153; 455/67.6, 429, 446, 504

(56) References Cited

U.S. PATENT DOCUMENTS 5,689,812 A * 11/1997 Takahashi ............... 455/67.16
5,751,243 A * 5/1998 Turpin ..................... 342/179
6,341,223 B1 * 1/2002 Park ........................ 455/446

FOREIGN PATENT DOCUMENTS

JP        9-33584         2/1997

* cited by examiner

Primary Examiner—Bryan Bui
(74) Attorney, Agent, or Firm—Young & Thompson

(57) ABSTRACT

An object of the present invention provides a method of predicting radio wave propagation characteristics that can implement a ray launching technique at higher speed. A plurality of Central Processing Units (CPUs) are interconnected via a network, and a recording device that can be read or written from all the CPUs is installed, and plural rays radiated from a predetermined transmitting point are divided into a plurality of groups, each group being assigned to a different CPU, whereby the CPUs perform a ray launching processing for the assigned rays independently and simultaneously to predict the radio wave propagation characteristics. The plural rays radiated from the transmitting point are divided and assigned to the CPUs, and the ray launching processing is performed simultaneously, resulting in a shorter computation time.

33 Claims, 13 Drawing Sheets

FIG. 5

|        | CPU-1 | CPU-2 | CPU-3 | CPU-4 |
|--------|-------|-------|-------|-------|
| RAY-1  | 1     | 9     | 7     | 5     |
| RAY-2  | 2     | 10    | 8     | 6     |
| RAY-3  | 3     | 1     | 9     | 7     |
| RAY-4  | 4     | 2     | 10    | 8     |
| RAY-5  | 5     | 3     | 1     | 9     |
| RAY-6  | 6     | 4     | 2     | 10    |
| RAY-7  | 7     | 5     | 3     | 1     |
| RAY-8  | 8     | 6     | 4     | 2     |
| RAY-9  | 9     | 7     | 5     | 3     |
| RAY-10 | 10    | 8     | 6     | 4     |

| i | PROJECTED OBJECT |
|---|---|
| 1 | x — AXIS |
| 2 | y — AXIS |
| 3 | z — AXIS |
| 4 | x y — PLANE |
| 5 | z x — PLANE |

F I G . 1 0
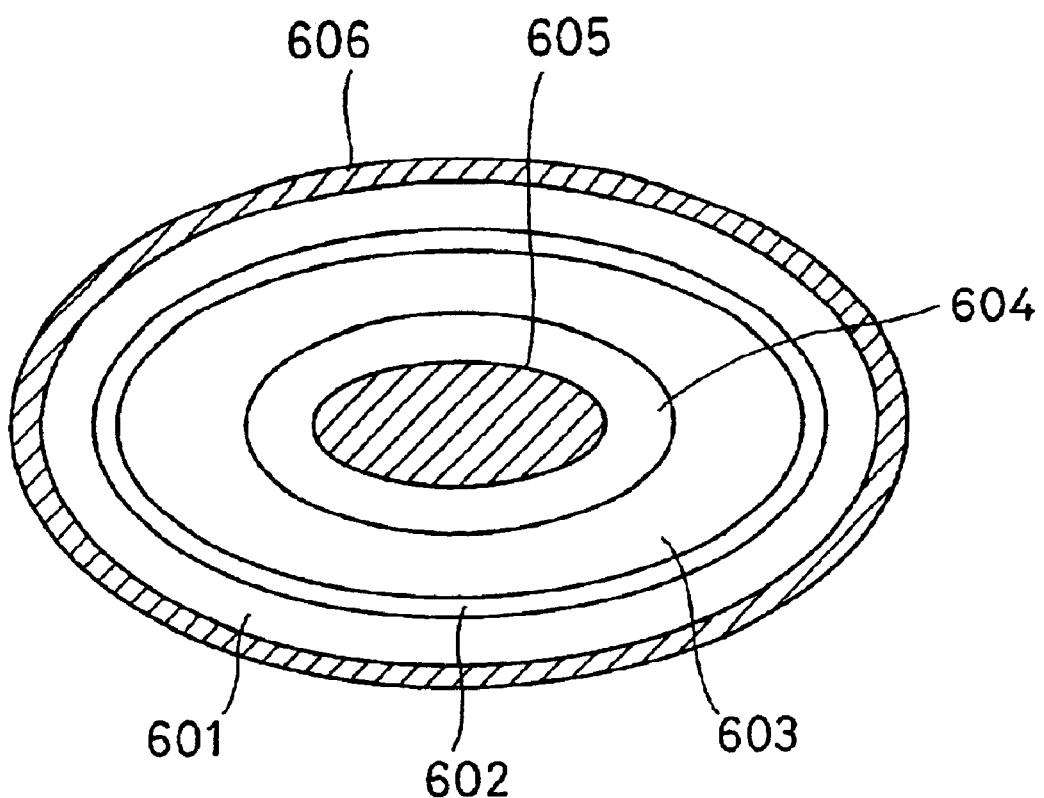

$$\begin{pmatrix} \text{ELEVATION ANGLE OF x AXIS WITH} \\ \text{RESPECT TO THE xy PLANE Tx=0°} \\ \text{ELEVATION ANGLE OF z AXIS WITH} \\ \text{RESPECT TO THE xy PLANE Tz=90°} \\ |\text{Tx}-t| = 10° < |\text{Tz}-t| = 80° \end{pmatrix}$$

SYSTEM AND METHOD FOR PREDICTING RADIO WAVE PROPAGATION CHARACTERISTICS

BACKGROUND OF THE INVENTION

1. Field of the Invention

The present invention relates to a system and method for predicting radio wave propagation characteristics, and in particular to a system for predicting the radio wave propagation characteristics by a technique of geometrical optics employing a so-called ray launching processing.

2. Description of the Related Art

A radio wave propagation simulator is employed to assist an arrangement of a base station or a host system in a radio communications system. The received power or delay spreading at any receiving point is assessed by using the radio wave propagation simulator to determine an suitable installation site of a transmitting station, so that the overall efficiency can be enhanced by reducing the number of base stations to be arranged.

The radio wave propagation simulation is largely classified into a statistical technique and a deterministic technique. The statistical technique gives an expression for estimating the propagation loss with the arguments of distance and frequency to determine the parameters on the basis of a large amount of data resulted from actual measurements of the propagation loss in accordance with the multivariate analysis at the time of determining parameters of the expression. On the other hand, the latter deterministic technique is one in which, considering that the radio wave radiated from an antenna is a collection of a number of radio wave rays, each ray is reflected and transmitted repeatedly on the geometrical optics, and propagated, and the rays incoming to an observation point is synthesized to obtain the propagation loss and the amount of delay.

This technique of geometrical optics is further classified into an imaging technique and a ray launching technique. The imaging technique determines a reflection and transmission path of the ray connecting between the transmitting and receiving points by obtaining an imaging point against the reflection surface. Since the reflection and transmission path is uniquely determined if the transmitting and receiving points and the reflecting and transmitting objects are defined, the imaging technique is one of searching for a strict propagation route of the ray. On the other hand, the ray launching technique is one in which the rays from an antenna are radiated to predetermined directions, irrespective of the receiving point, and the ray passing near the receiving point through the repeated reflection and transmission is regarded as the ray incoming to the receiving point. This was described in Japanese Patent Laid-Open No. 9-33584 specification, for example.

The ray launching technique solves approximately, but not strictly like the imaging technique, the propagation route of the ray connecting between the transmitting and receiving points, and has a feature of shortening the time needed to search for the propagation route.

FIG. 13 is a view for explaining the operation of the ray launching technique in the case where an observation area 020, a transmitting point 009, a receiving point 010, and two contents 001 and 002 within the observation area are provided. In FIG. 13, for the simplicity, the operation is explained only in the two dimensional plane, but practically, the operation may be performed in the three dimensional space.

First of all, a ray is radiated from the transmitting point 009 in a direction toward the propagation route 003. With regard to all the contents within the observation area, it is determined whether or not the ray radiated in that direction strikes the contents existing within the observation area. The ray strikes a content 001 at a reflection point 012 to generate a transmitted ray 011 and a reflected ray 004. The ray 004 produced by reflection further strikes a content 002 to generate a transmitted ray 013 and a reflected ray 008 in similar manner. The reflected ray 008, which passes in the vicinity of the receiving point 010, is regarded as the incoming wave in the observation point.

Specifically, the propagation routes 003, 004 and 008, the receiving strength as defined from a total of propagation distances and the incoming delay time are recorded in FIG. 14. In FIG. 14, the transverse axis 101 represents the delay time required for the ray to arrive from the transmitting point 009 via the routes 003, 004 and 008 to the observation point 010, and the longitudinal axis 102 represents the received electric-field strength of the ray passing through the route.

The ray from the transmitting point 009 in the direction toward the propagation route 003 has the transmitted rays 011 and 013, for which the transmission and reflection are repeatedly searched, as in the propagation routes 003, 004 and 008, wherein the ray passing in the vicinity of the receiving point 010 is treated as the incoming wave, as in the propagation route 008, and the above processing is continued till the search end condition is met. The search end condition is that the received field strength at the reflection and transmission point falls below a predetermined value. In this invention, the above process is called the ray launching processing.

After the ray radiated from the transmitting point 009 in the direction toward the propagation route 003 is searched for the reflection and transmission, the same ray launching processing is made by changing the radiation angle of the ray radiated from the transmitting point 009, as in a route 006, for example, and investigating all the radiation directions from the transmitting point 009, or partial radiation directions as defined beforehand. Lastly, FIG. 15 which shows a delay profile for the receiving point 010 is obtained. In FIG. 15, the transverse axis 201 represents the delay time when the ray comes in from the transmitting point 009, and the longitudinal axis 202 represents the received electric-field strength of the ray passing through the route. The received power at the receiving point 010 is given by a total of received strength for all the paths as indicated in FIG. 15, and the delay spreading for indicating degrees of the distortion is given by the standard deviation of the delay time.

The ray launching technique that gives a solution of the propagation route of the ray connecting the transmitting and receiving points approximately, but not strictly as by the imaging technique, takes a shorter time for searching the propagation route than the imaging method. However, it still takes a lot of time in the case where there is a large building or there are a very great number of fixtures (e.g., contents 001 and 002 in FIG. 13) installed within the building.

BRIEF SUMMARY OF THE INVENTION

It is an object of the present invention to provide a system and method for predicting the radio wave propagation characteristics in which the ray launching technique is performed at higher speed, employing a parallel computer, and a recording medium for recording a program for use with the method.

According to the present invention, there is provided a system for predicting the radio wave propagation characteristics in which a plurality of contents, a transmitting point and a receiving point are provided in an observation space as defined within a three dimensional space, and the plural radio wave rays are radiated at different angles from the transmitting point over the observation space, the rays being reflected or transmitted repetitively upon the collision with the plurality of contents as the rays proceed, and in which a ray launching processing for acquiring the information of the passage time and the intensity of the ray at the time of passing in the vicinity of the receiving point is performed while the ray is being reflected or transmitted repetitively, the system comprising a plurality of CPUs (Central Processing Units) that are interconnected via a network, wherein the plural rays radiated from the transmitting point are divided into a plurality of groups, each group being allocated to a different CPU, and the ray launching processing is performed for all the allocated rays independently and simultaneously by the plurality of CPUs.

According to the present invention, there is provided a system for predicting the radio wave propagation characteristics in which a plurality of contents, a transmitting point and a receiving point are provided in an observation space as defined within a three dimensional space, and the plural radio wave rays are radiated at different angles from the transmitting point over the observation space, the rays being reflected or transmitted repetitively upon the collision with the plurality of contents as the rays proceed, and in which a ray launching processing for acquiring the information of the passage time and the intensity of the ray at the time of passing in the vicinity of the receiving point is performed while the ray is being reflected or transmitted repetitively, the system comprising a plurality of CPUs (Central Processing Units) that are interconnected via a network, and a recording device that can be accessed from each of all the CPUs, wherein each of the plural rays radiated from the transmitting point has a respective priority set, each of the CPUs is assigned one ray in the order of higher priority, and the ray launching processing is performed for the assigned rays simultaneously by the plurality of CPUs, wherein the ray with the next priority that has not yet been assigned to the CPU is selected in the order of the CPUs that have ended the ray launching processing, the CPU performing the ray launching processing for the selected ray, and an indicator for indicating that the selected ray is processed by the CPU is recorded into the recording device, and wherein a ray selecting process of selecting the ray by referring to the recording device and the ray launching processing are repeatedly performed until the last ray is reached.

According to the present invention, there is provided a system for predicting the radio wave propagation characteristics in which a plurality of contents, a transmitting point and a receiving point are provided in an observation space as defined within a three dimensional space, and the plural radio wave rays are radiated at different angles from the transmitting point over the observation space, the rays being reflected or transmitted repetitively upon the collision with the plurality of contents as the rays proceed, and in which a ray launching processing for acquiring the information of the passage time and the intensity of the ray at the time of passing in the vicinity of the receiving point is performed while the ray is being reflected or transmitted repetitively, the system comprising a plurality of CPUs (Central Processing Units) that are interconnected via a network, a recording device that can be accessed from all the CPUs, and a priority table set up for each of the CPUs and indicating a priority of each of the plural rays radiated from the transmitting point, the priority table being different for each of the CPUs, wherein the ray having the highest priority is selected from among the rays for which the lay launching processing has not yet been performed by the CPUs by referring to the priority table provided for each of the CPUs, and each of the CPU performs the lay launching processing for the selected ray, in which the ray launching processing is performed simultaneously by all the CPUs, wherein each of the CPUs records an indicator for indicating that the ray launching processing is performed for the ray in the recording device, and each of the CPUs grasps whether or not the ray launching processing has been performed for a certain ray by referring to the recording device, and wherein each of the CPUs performs repetitively a ray assignment processing and the ray launching processing for the ray until the last ray is reached.

The priority of the ray having a longer processing time for the ray launching processing is set to be higher in the CPU of greater processing capability and lower in the CPU of smaller processing capability.

To detect a shield shielding a ray among a plurality of contents in the ray launching processing, each of the CPUs comprising first image acquiring means for acquiring a first image of the ray projected onto a projected object preset within the observation space, second image acquiring means for acquiring a second image of each of the contents projected onto the projected object, determination means for determining whether or not the first image and the second image intersect each other, and detection object concluding means for concluding a corresponding content as the shield detection object for the ray, in the case where the result of determination indicates the intersection.

Each of the CPUs further includes control means for controlling the execution of the first image acquiring means, the second image acquiring means, the determination means and the detection object concluding means, such that the M projected objects (M is an integer of 2 or greater) are set up, the first image acquiring means, the second image acquiring means, the determination means and the detection object concluding means are controlled for execution for a projected object i=1 (i is from 1 to M), then for a content concluded by the detected object concluding means, the first image acquiring means, the second image acquiring means, the determination means and the detection object concluding means are controlled for execution for a projected object i=2, and the same control for execution is repeated till a projected object i=M.

Further, to detect a shield shielding a ray among a plurality of contents in the ray launching processing, each of the CPUs comprising means for acquiring an image A of the ray projected onto a projected object i, in which a plurality of projected objects i (i=1 to M: M is an integer of 2 or greater) are set up within the observation space, a group k (k=0 to M) representing part or all of the contents is defined, and a group o is a set of all the contents as defined within the observation space, means for selecting one content from the group i−1 and acquiring an image B of the content projected onto the projected object i, means for practicing a selectively incorporating process by checking whether or not the images A and B intersect, and selectively incorporating the content into the group i if the images A and B intersect, means for practicing the selectively incorporating process of the contents included in the group i by practicing the selectively incorporating process for each of all other contents in the group i−1, and means for detecting the shield for the contents included in a group M and concluded ultimately by practicing the selectively incorporating process of the contents for i=1 to M in sequence.

Supposing that the projected object i is a line or a plane as defined in the three dimensional space, different lines or planes are assigned to the projected objects. Also, the line is assigned to each of the projected objects i=1 to L (L is an integer such as $2 \leq L < M$), and the plane is assigned to each of the projected objects i=L+1 to M. The projected object i is set at a smaller value as the length of the ray projected onto the projected object is smaller.

Furthermore, supposing that the absolute value of an elevation angle of the ray with respect to a predetermined plane is t, and the absolute value of an elevation angle of the projected object with respect to the predetermined plane is T, the projected object is variably set in accordance with the value of t, and the projected object i is set such that there is a greater difference between t and T for smaller i.

According to the present invention, there is provided a method of predicting the radio wave propagation characteristics in which a plurality of contents, a transmitting point and a receiving point are provided in an observation space as defined within a three dimensional space, and the plural radio wave rays are radiated at different angles from the transmitting point over the observation space, the rays being reflected or transmitted repetitively upon the collision with the plurality of contents as the rays proceed, and in which a ray launching processing for acquiring the information of the passage time and the intensity of the ray at the time of passing in the vicinity of the receiving point is performed while the ray is being reflected or transmitted repetitively, the method comprising dividing the plural rays radiated from the transmitting point into a plurality of groups, and allocating each group to a different CPU, and performing the ray launching processing for all the allocated rays independently and simultaneously by the plurality of CPUs.

According to the present invention, there is provided a method of predicting the radio wave propagation characteristics in which a plurality of contents, a transmitting point and a receiving point are provided in an observation space as defined within a three dimensional space, and the plural radio wave rays are radiated at different angles from the transmitting point over the observation space, the rays being reflected or transmitted repetitively upon the collision with the plurality of contents as the rays proceed, and in which a ray launching processing for acquiring the information of the passage time and the intensity of the ray at the time of passing in the vicinity of the receiving point is performed while the ray is being reflected or transmitted repetitively, the method comprising setting the plural rays radiated from the transmitting point with respective priorities, and assigning each of the CPUs with one ray in the order of higher priority, performing the ray launching processing for the assigned rays simultaneously by the plurality of CPUs, selecting the ray with the next priority that has not been assigned to the CPU in the order of the CPUs that have ended the ray launching processing, each of the CPUs performing the ray launching processing for the selected ray, and recording an indicator for indicating that the selected ray is processed in the CPU into the recording device, in which a ray selecting process for selecting the ray by referring to the recording device and the ray launching processing are repeatedly performed until the last ray is reached.

According to the present invention, there is provided a method of predicting the radio wave propagation characteristics in which a plurality of contents, a transmitting point and a receiving point are provided in an observation space as defined within a three dimensional space, and the plural radio wave rays are radiated at different angles from the transmitting point over the observation space, the rays being reflected or transmitted repetitively upon the collision with the plurality of contents as the rays proceed, and in which a ray launching processing for acquiring the information of the passage time and the intensity of the ray at the time of passing in the vicinity of the receiving point is performed while the ray is being reflected or transmitted repetitively, the method comprising setting up a priority table for each of the CPUs and indicating a priority of each of the plural rays radiated from the transmitting point, the priority table being different for each of the CPUs, selecting the ray having the highest priority from among the rays for which the lay launching processing has not yet been performed by the CPUs by referring to the priority table provided for each of the CPUs, each of the CPUs performing the lay launching processing for the selected ray, in which the ray launching processing is simultaneously by all the CPUs, each of the CPUs recording an indicator for indicating that the ray launching processing is performed for the ray into the recording device, and each of the CPUs grasping whether or not the ray launching processing has been performed for a certain ray by referring to the recording device, in which each of the CPUs performs repetitively an assignment processing and the ray launching processing for the ray until the last ray is reached.

To detect a shield shielding a ray among a plurality of contents in the ray launching processing, the method comprising, in each of the CPUs, a first step of acquiring a first image of the ray projected onto a projected object preset within the observation space, a second step of acquiring a second image of each of the contents projected onto the projected object, a third step of determining whether or not the first image and the second image intersect each other, and a fourth step of concluding a corresponding content as the shield detection object for the ray, in the case where the result of determination indicates the intersection.

Also, the M projected objects (M is an integer of 2 or greater) are set up, the first to fourth steps are executed for a projected object i=1 (i is from 1 to M), then for a content concluded at the fourth step, the first to fourth steps are executed for a projected object i=2, and the same processing is repeated till a projected object i=M.

Furthermore, to detect a shield shielding a ray among a plurality of contents in the ray launching processing, the method comprising, in each of the CPUs, a step of acquiring an image A of the ray projected onto a projected object i, in which a plurality of projected objects i (i=1 to M: M is an integer of 2 or greater) are set up within the observation space, a group k (k=0 to M) representing part or all of the contents is defined, and a group o is a set of all the contents as defined within the observation space, a step of selecting one content from the group i−1 and acquiring an image B of the content projected onto the projected object i, a step of practicing a selectively incorporating process by checking whether or not the images A and B intersect, and selectively incorporating the content into the group i if the images A and B intersect, a step of practicing the selectively incorporating process of the contents included in the group i by practicing the selectively incorporating process for each of all other contents in the group i−1, and a step of detecting the shield for the contents included in a group M and concluded ultimately by practicing the selectively incorporating process of the contents for i=1 to M in sequence.

Also, supposing that the projected object i is a line or a plane as defined in the three dimensional space, different lines or planes are assigned to the projected objects. Also, the line is assigned to each of the projected objects i=1 to L (L is an integer such as $2 \leq L < M$), and the plane is assigned to each of the projected objects i=L+1 to M. Moreover, the projected object i is set at a smaller value as the length of the ray projected onto the projected object is smaller. Also, supposing that the absolute value of an elevation angle of the ray with respect to a predetermined plane is t, and the absolute value of an elevation angle of the projected object with respect to the predetermined plane is T, the projected object is variably set in accordance with the value of t, and the projected object i is set such that there is a greater difference between t and T for smaller i.

According to the present invention, there is provided a recording medium for recording a program for enabling a computer to execute a method of predicting the radio wave propagation characteristics in which a plurality of contents, a transmitting point and a receiving point are provided in an observation space as defined within a three dimensional space, and plural radio wave rays are radiated at different angles from the transmitting point over the observation space, the rays being reflected or transmitted repetitively upon the collision with the plurality of contents as the rays proceed, and in which a ray launching processing for acquiring the information of the passage time and the intensity of the ray at the time of passing in the vicinity of the receiving point is performed while the ray is being reflected or transmitted repetitively, the program comprising a step of dividing the plural rays radiated from the transmitting point into a plurality of groups, and allocating each group to a different CPU, and a step of performing the ray launching processing for all the allocated rays independently and simultaneously by the plurality of CPUs.

According to the present invention, there is provided a recording medium for recording a program for enabling a computer to execute a method of predicting the radio wave propagation characteristics in which a plurality of contents, a transmitting point and a receiving point are provided in an observation space as defined within a three dimensional space, and the plural radio wave rays are radiated at different angles from the transmitting point over the observation space, the rays being reflected or transmitted repetitively upon the collision with the plurality of contents as the rays proceed, and in which a ray launching processing for acquiring the information of the passage time and the intensity of the ray at the time of passing in the vicinity of the receiving point is performed while the ray is being reflected or transmitted repetitively, the program comprising a step of setting the plural rays radiated from the transmitting point with respective priorities, and assigning each of the CPUs with one ray in the order of higher priority, a step of performing the ray launching processing for the assigned rays simultaneously by the plurality of CPUs, a step of selecting the ray with the next priority that has not yet been assigned to the CPU in the order of the CPUs that have ended the ray launching processing, each of the CPUs performing the ray launching processing for the selected ray, and a step of recording an indicator for indicating that the selected ray is processed by the CPU into the recording device, in which a ray selecting process for selecting the ray by referring to the recording device and the ray launching processing are repeatedly performed until the last ray is reached.

According to the present invention, there is provided a recording medium for recording a program for enabling a computer to execute a method of predicting the radio wave propagation characteristics in which a plurality of contents, a transmitting point and a receiving point are provided in an observation space as defined within a three dimensional space, and the plural radio wave rays are radiated at different angles from the transmitting point over the observation space, the rays being reflected or transmitted repetitively upon the collision with the plurality of contents as the rays proceed, and in which a ray launching processing for acquiring the information of the passage time and the intensity of the ray at the time of passing in the vicinity of the receiving point is performed while the ray is being reflected or transmitted repetitively, the program comprising a step of setting up a priority table for each of the CPUs and indicating a priority of each of the plural rays radiated from the transmitting point, the priority table being different for each of the CPUs, a step of selecting a ray having the highest priority from among the rays for which the lay launching processing has not yet been performed by a self CPU and the other CPUs by referring to the priority table provided for each of the CPUs, each of the CPUs performing the lay launching processing for the selected ray, and a step of performing the ray launching processing simultaneously by all the CPUs, each of the CPUs recording an indicator for indicating that the ray launching processing is performed for the ray in the recording device, and a step of grasping whether or not the ray launching processing has been performed for a certain ray by referring to the recording device in each of the CPUs, whereby each of the CPUs performs repetitively the assignment processing and the ray launching processing for the ray until the last ray is reached.

The operation of the present invention will be set forth below. The ray launching processing for the plural rays radiated from the predetermined transmitting point is configured so as to be performed simultaneously and in parallel by the plurality of CPUs, in such a way as to divide the plural rays radiated from the transmitting point and allocating one ray to each of the CPUs, resulting in a shorter computation time.

BRIEF DESCRIPTION OF THE DRAWINGS

FIG. 5 is a table showing another example of a ray assigning method in the second embodiment of the invention;

FIG. 10 is a view showing how contents are included in group 1;

DETAILED DESCRIPTION OF THE PREFERRED EMBODIMENTS

Figure 1:
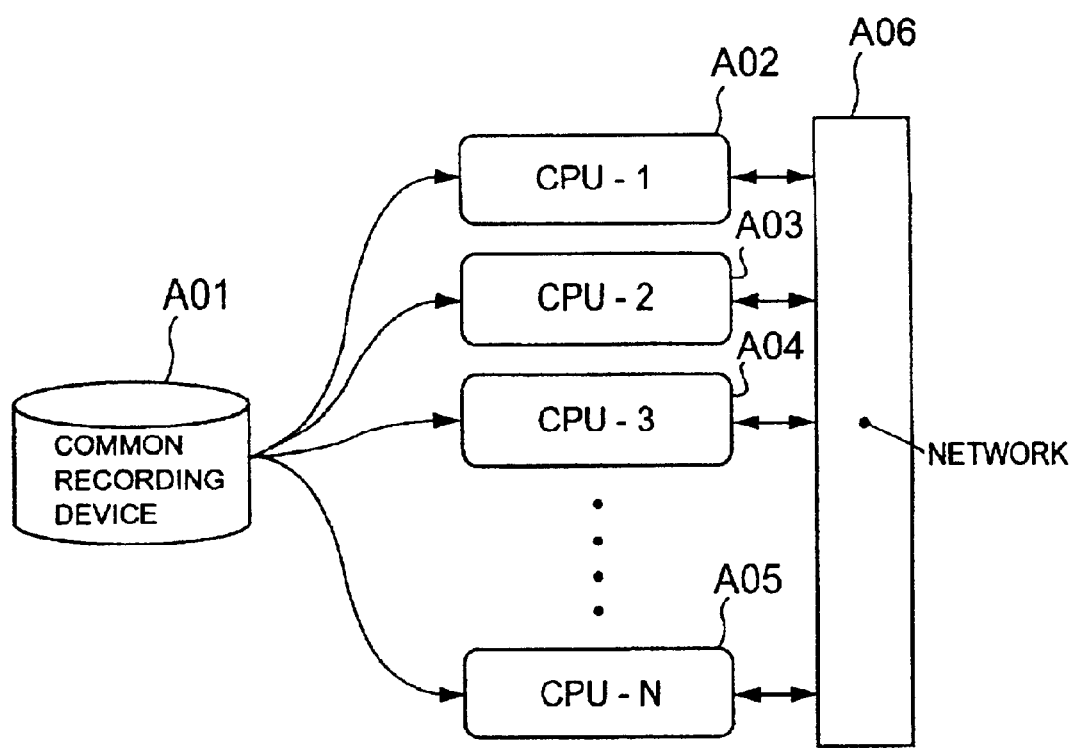
FIG. 1 is a block diagram showing a configuration of the present invention.

The preferred embodiments of the present invention will be described below by reference to the accompanying drawings. FIG. 1 is a diagram showing a configuration of a system according to an embodiment of the invention. The system consists of N Central Processing Units (CPU 1 to N) A02 to A05, a common recording device A01, and a network A06, each CPU being communicable via the network A06 with all the other CPUs. The common recording device A01 can be read or written from all the CPUs 1 to N.

The common recording device A01 may be installed inside any of the CPUs and in this case the other CPUs than the corresponding one are accessed to the common recording device A01 via the network A06. The common recording device A01 may be disposed on the network A06. The common recording device A01 may store an operation program for reading or writing the delay profile or controlling each CPU.

Figure 2:
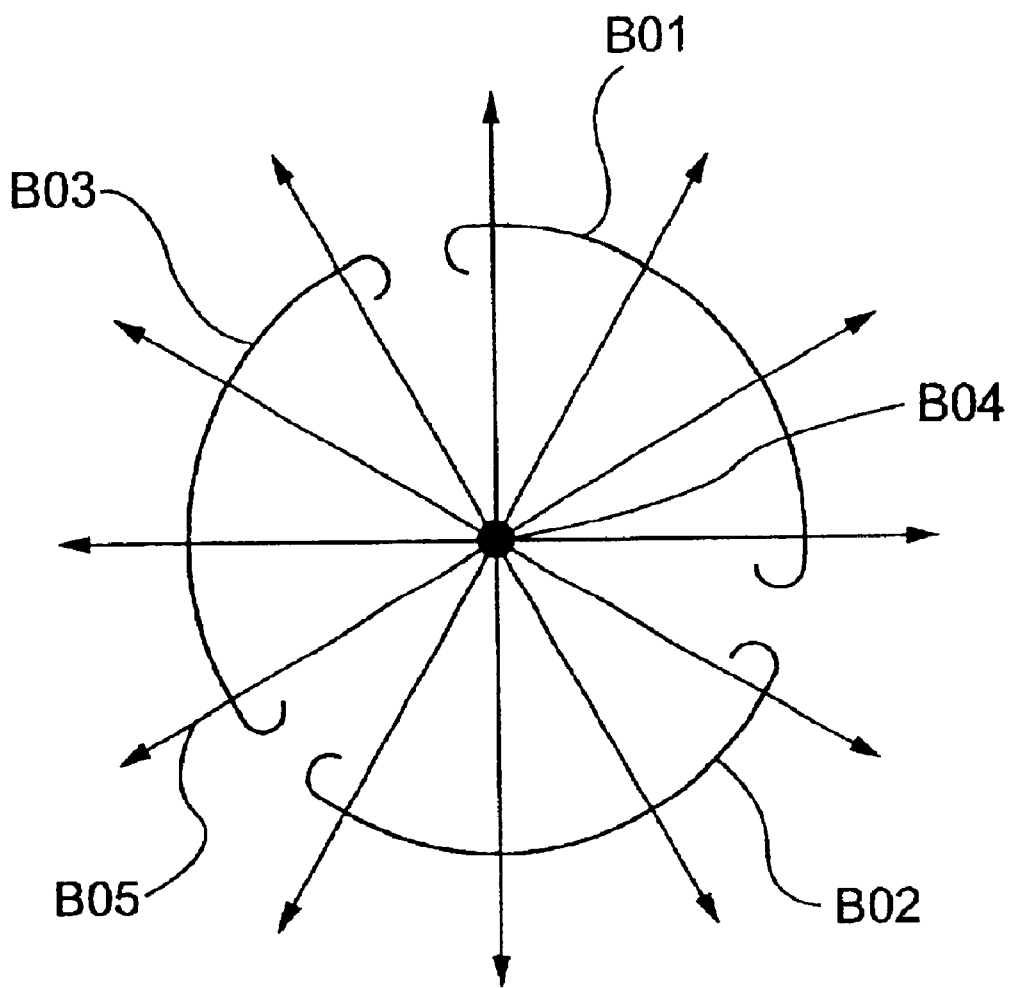
FIG. 2 is a view showing a grouping of rays according to a first embodiment of the invention.

Referring to FIG. 2, a method of predicting the radio wave propagation characteristics according to a first embodiment of the invention will be now set forth. FIG. 2 shows one example of a ray (e.g., B05) radiated from a transmitting point B04. The ray is drawn in the two dimensional plane, but actually radiated three dimensionally. As shown in FIG. 2, twelve rays are classified into three groups B01, B02 and B03, and each group is assigned to a different CPU. The grouping of rays is not required to be even.

Figure 13:
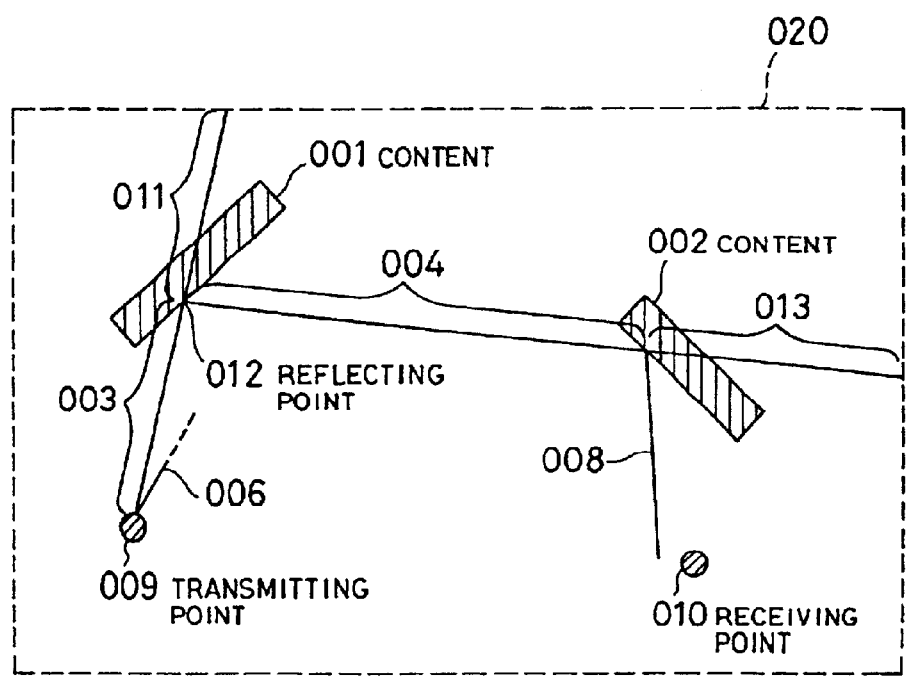
FIG. 13 is a view for explaining the ray launching technique.
Figure 14:
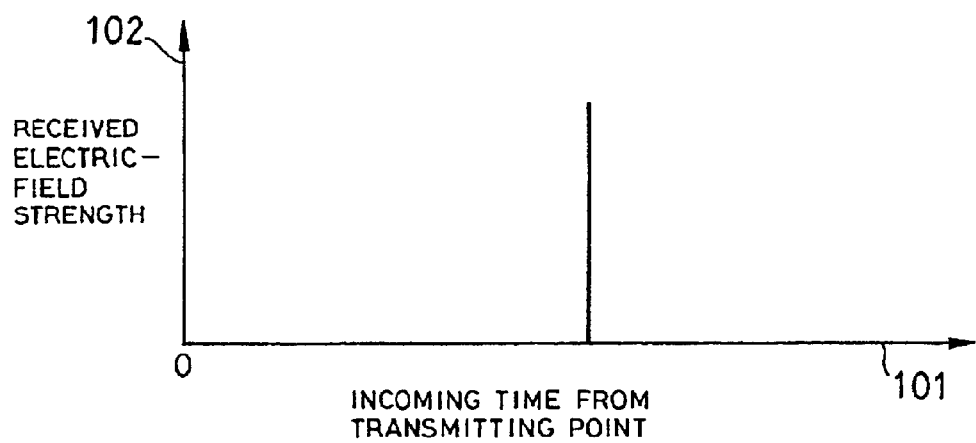
FIG. 14 is a graph showing an example of a path profile at an observation point for one ray.
Figure 15:
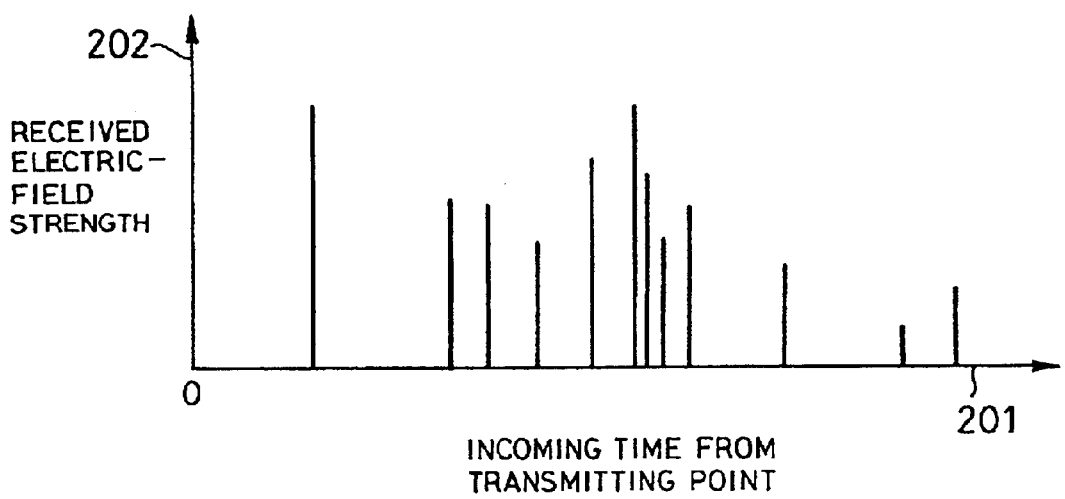
FIG. 15 is a graph showing a path profile at an observation point obtained by the ray launching technique.

Each CPU performs the ray launching processing as described in connection with FIG. 13 for the assigned rays. The result of the ray launching processing performed in the different CPU is recorded in the recording device A01 that can be read or written by all the CPUs, and accumulated, finally resulting in a delay profile as shown in FIG. 15.

In this way, the radiated rays are grouped, different CPUs perform the ray launching processing in parallel, the computation speed is made faster than that in case where all the rays are processed through only one CPU.

Figure 3:
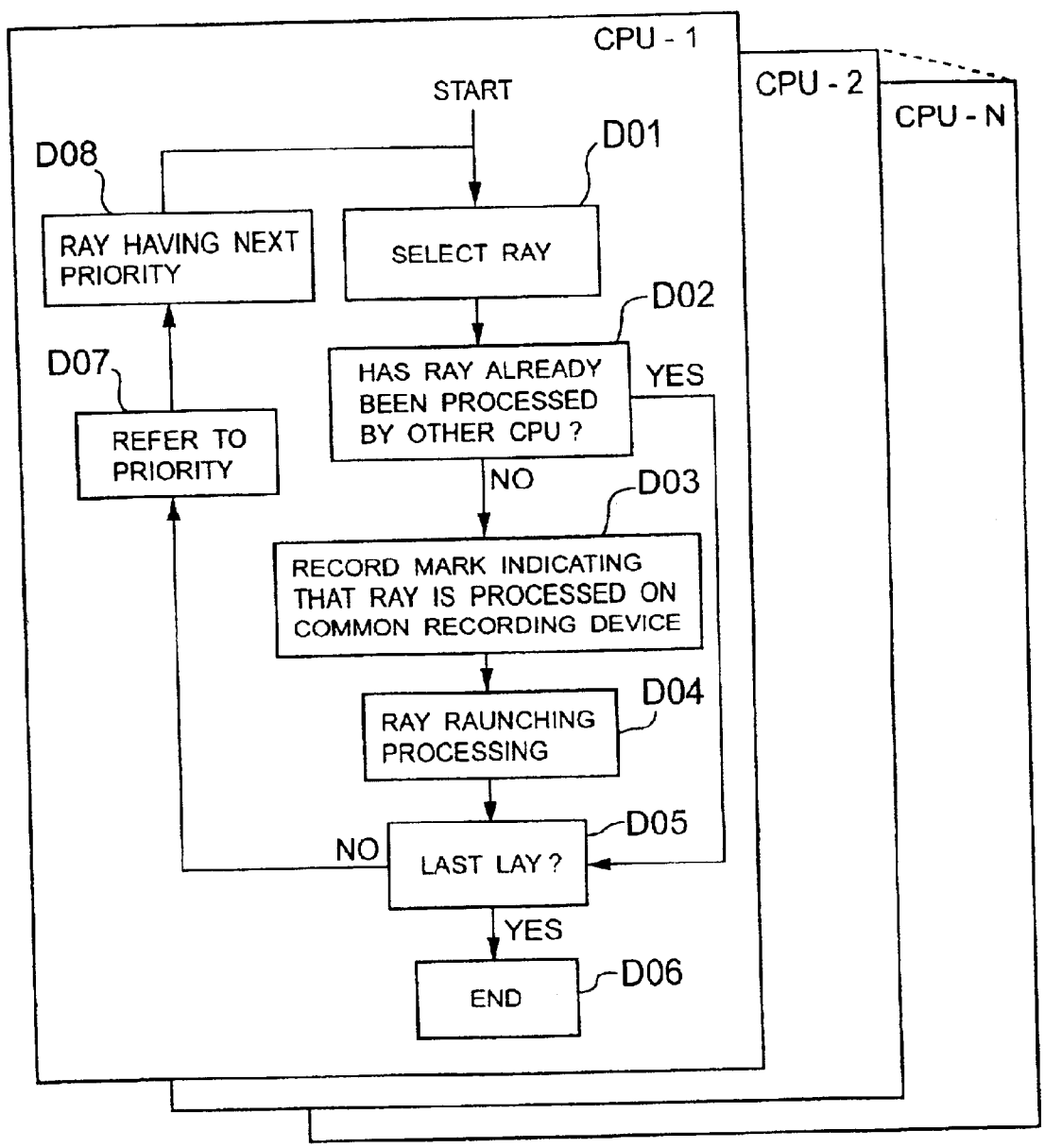
FIG. 3 is a flowchart of a processing performed in each CPU according to a second embodiment of the invention.

Next, referring to FIG. 3, a ray assigning process according to a second embodiment of the invention will be now set forth. FIG. 3 is a diagram showing the flowchart of a processing performed in each CPU in the second embodiment of the invention. The CPUs 1 to N perform the processing as shown in FIG. 3 in parallel. The rays radiated from the transmitting point are set with the respective priorities, and a priority table listing the ray and its priority is set up. This priority table may or may not be the same for all the CPUs.

If the processing is started in each CPU, the CPU selects a ray having the highest priority from among the rays radiated from the transmitting point (step D01). It is noted that the ray is selected by each CPU so as to avoid the same ray to be selected by the CPUs immediately after starting the processing. At step D02, it is determined whether or not the ray launching processing for the selected ray has been already performed by any other CPUs. This determination is made by referring to a record on the common recording device that can be read or written from all the CPUs. If the ray launching processing for the ray has been already performed by any other CPUs, the operation transfers to step D05, or otherwise proceeds to step D03.

At step D03, a mark indicating that the ray is processed is recorded in to the common recording device, and at step D04, the ray launching processing for the ray is performed. At step D04, the result of the ray launching processing for the ray is recorded in the recording device A01 that can be read or written by all the CPUs, and accumulated, thereby producing a delay profile as shown in FIG. 15.

If the ray launching processing is completed at step D04, the operation proceeds to step D05, where it is determined whether or not the selected ray is the last ray. If so, the operation proceeds to step D06, whereby the process is ended. If the selected ray is not determined to be the last ray at step D05, the operation transfers to step D07 to refer to the priority table. Thereafter, at step D08, the ray having the next priority is decided. At step D01, the ray is newly selected, and the same process as above is repeated till the last ray is reached.

Figure 4:
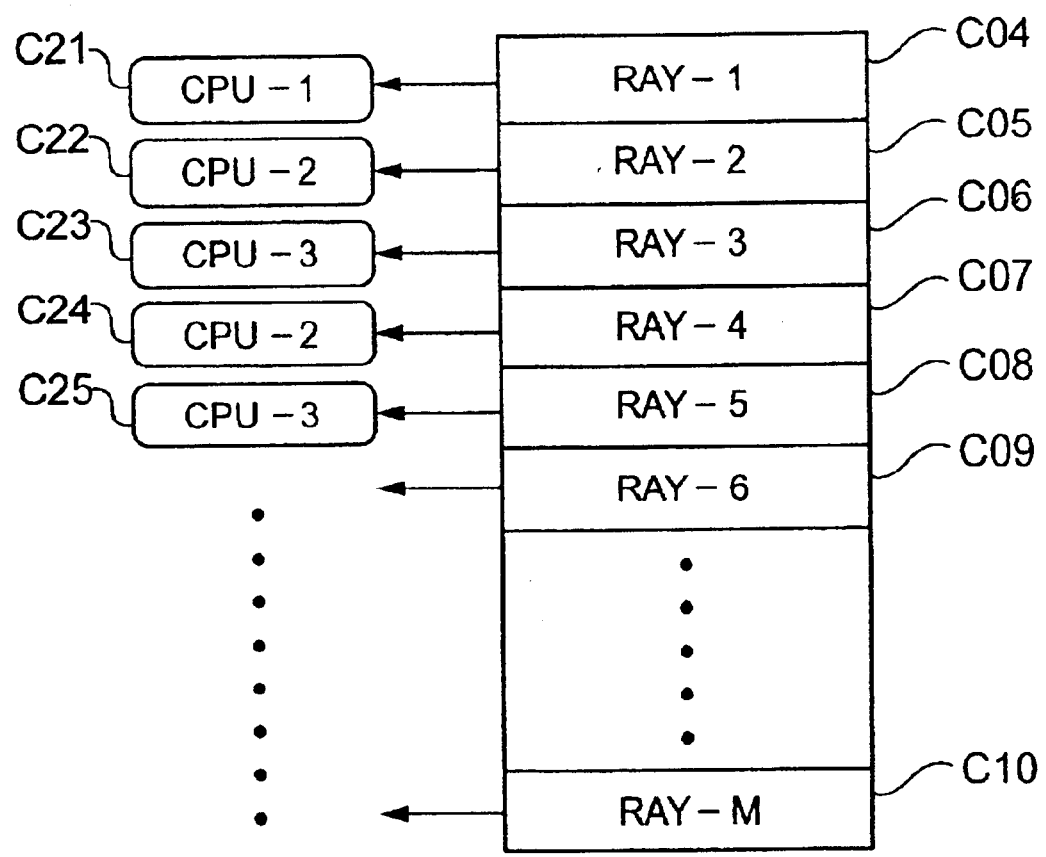
FIG. 4 is a diagram showing one example of a priority table in the second embodiment of the invention.

FIG. 4 is a diagram showing one example of the priority table as described in connection with FIG. 3, in which the priority table is common to all the CPUs. If the priorities are stored in the common recording device A01, each CPU can know the priority by referring to the common recording device. In the priority table as shown in FIG. 4, the ray located at the more upper level has a higher priority. The ray launching processing is performed in the order of the priority table in accordance with the flowchart as described in connection with FIG. 3.

Now, it is assumed that the system is composed of three CPUs, CPU-1, CPU2 and CPU-3 as indicated by C21, C22 and C23 are respectively assigned the ray-1, ray-2 and ray-3 as the initial setting, and the CPUs start the processing simultaneously. Thereafter, if a CPU-2 has completed the processing at first, the CPU-2 is assigned the ray-4 having the next priority, as indicated by C24, to perform the ray launching processing.

Thereafter, if a CPU-3 has ended the processing for the ray 3 assigned at C23, the CPU-3 is assigned the ray-5 as indicated by C25 to perform the processing. Similarly, the CPUs that have ended the processing are assigned successively the rays and the ray launching processing is repeated by the CPUs till the last ray-M is reached. Each of the CPUs grasps which ray is unprocessed with the next priority by referring to the priority table and the common recording device, on the other hand, with respect to a ray in which a processing is started, attaches a mark indicating that the CPU has performed the processing (e.g., sets a flag such as "1") on the common recording device, thereby informing the unprocessed rays to other CPUs.

The results of the ray launching processing executed by the CPUs are recorded in the common recording device A01 that can be read or written by all the CPUs, and accumulated, resulting in a delay profile as shown in FIG. 15.

In the case where the CPUs have different processing capabilities, the CPU having higher processing capability (i.e., faster computation speed) can complete the ray launching processing faster. On the other hand, it takes different time to perform the processing depending on the radiation angle of ray. In this embodiment of the invention, the CPUs perform the ray launching processing successively in the order of CPU that has ended the processing earlier, and thus the CPUs can be assigned the rays adaptively in accordance with the processing capability of each CPU, whereby the entire processing can be completed in the minimum computation time.

FIG. 5 is a diagram showing another example of a method of assigning the rays according to the second embodiment of the invention. In FIG. 5, the priority table of rays in the four CPUs CPU-1 to CPU-4 is listed in the case where ten rays ray-1 to ray-10 are radiated from the transmitting point, in which the smaller number indicates the higher priority. In this example, each of the CPUs has a different priority table as shown in FIG. 5. In accordance with the processing as shown in FIG. 3, the CPUs perform the ray launching processing in parallel in the order of rays having higher priority assigned to the CPUs, for which the ray launching processing has not been yet performed by other CPUs.

In the example with the priority table as shown in FIG. 5, as in the example as shown in FIG. 4, since the CPUs perform the ray launching processing successively in the order of CPU that has ended the processing earlier and in accordance with the priority table, the rays can be assigned adaptively in accordance with the processing capability of each CPU, so that the entire processing can be completed in the minimum computation time. Also, in this example, since each CPU can arbitrarily set up the order of rays to perform the ray launching processing, for example, the priority of the ray at radiation angle which takes a longer time in computation may be set to be higher for the CPU having greater processing capability, and lower for the CPU having smaller processing capability, whereby the computation time per ray can be equalized.

A program for the processing as shown in FIG. 3 may be stored beforehand in the common recording device A01, loaded into each of the CPUs CPU-1 to CPU-N at the time of starting the processing, and executed by the CPUs, or may be stored in recording means, not shown, within each of the CPUs.

Herein, with regard to the ray launching technique as performed at step D04 in FIG. 3, it is required to check for all the contents existing within the observation space whether or not the ray collides with them to detect the reflecting or transmitting point on the propagation route of the ray. It is necessary to solve multiple variable equations to check whether or not the ray intersects the content within the three dimensional space, which requires a quite amount of computation. That is, to detect the reflecting or transmitting point, an expression as defined in the three dimensional space representing the reflection face and an expression as defined in the three dimensional space representing the ray are simultaneously solved as a general calculation technique, bringing about a considerable amount of computation. Hence, the amount of computation needed for the investigation increases with more contents within the observation space, and it takes a lot of time to assess the propagation characteristics.

Then, in this invention, the parallel processing is performed by a plurality of CPUs to make the above computation for the different rays, and shorten the computation time. In order to further shorten the computation time, the present inventors have proposed a method of lessening the amount of computation to check whether or not the ray intersects any contents as the shields in Japanese Patent Application No. 2000-304294. This method will be set forth with reference to FIGS. 6 to 12.

Figure 6:
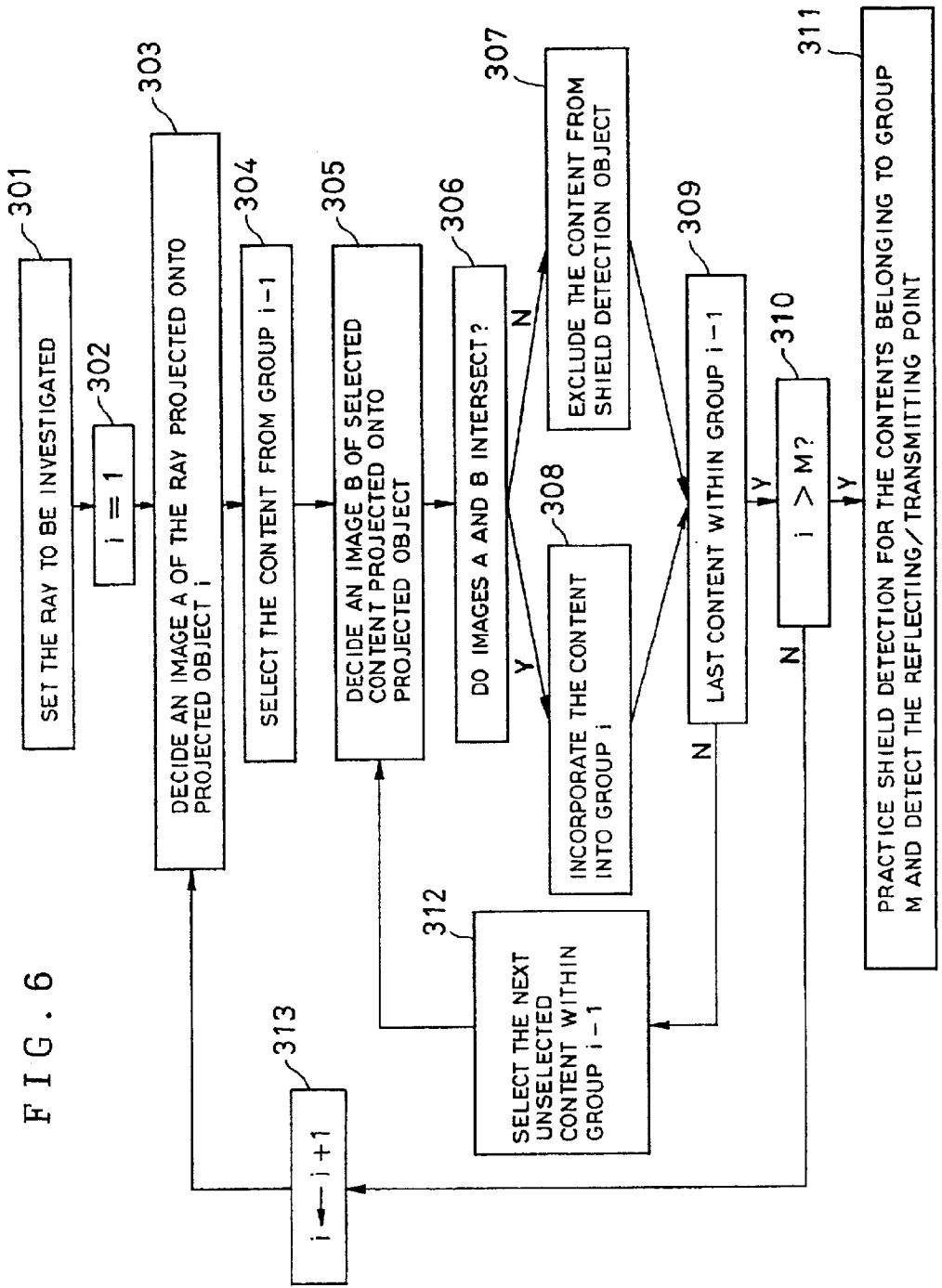
FIG. 6 is a flowchart showing an exemplary operation of a ray launching processing useful in the example of the invention.

FIG. 6 is a flowchart showing a method of detecting a shield. It is assumed that an observation area is given in the three dimensional space, the contents such as a wall and a fixture are provided within the observation area, and the rays to be investigated are directed (step 301). The rays indicate rays radiated from an antenna or rays produced by reflection or transmission in accordance with a ray launching algorithm. Specifically, a propagation route 003 or 004 is shown in FIG. 13 as described in the Description of the Prior Art.

The internal variable i is defined, and i is set to 1 as the initial value (step 302). And an image A of the ray projected onto the projected object i is decided (step 303). Herein, the projected object i employs the line or plane as defined in the three dimensional space, the number of i being M. As the line, the x-axis, y-axis or z-axis is assumed to be set in this embodiment. As the plane, the xy plane, yz plane or zx plane is assumed to be set. And the projected object i is assumed to be set differently for each i.

Figures 7, 8:
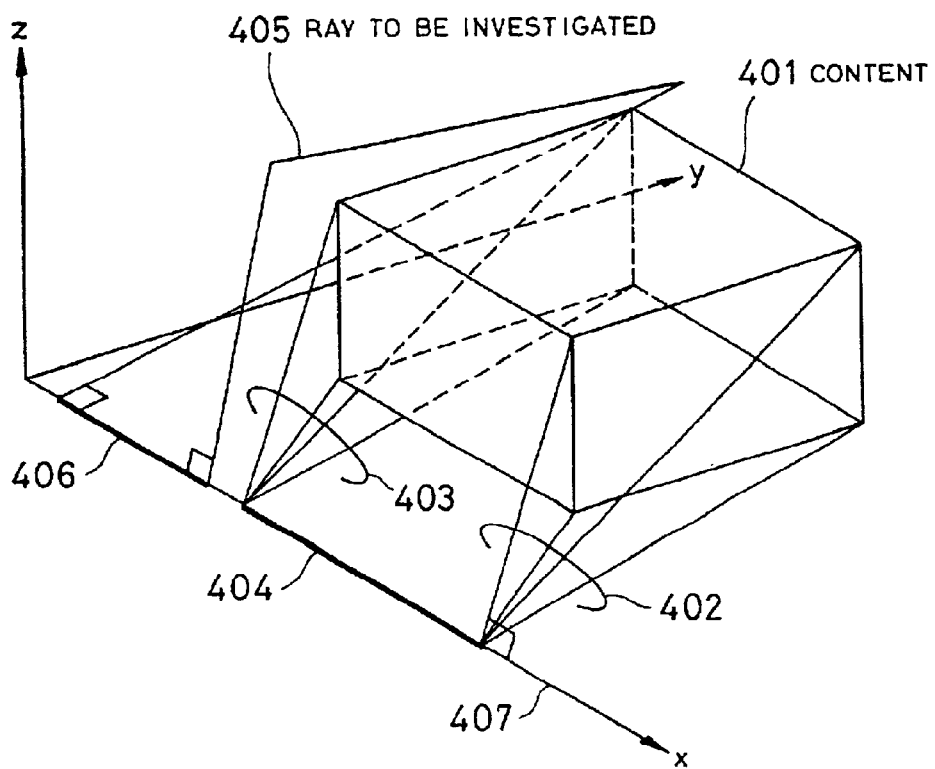
FIG. 7 is a table showing set rays of the projected objects.
FIG. 8 is a view showing one example of projection when a projected object is an x-axis.

A projection method in a case where the projected object is the line involves, for example, investigating the points of intersection of the perpendicular from both end points of the ray toward the projected line, and assuming the line segment connecting the points located at its both ends as an image A (see FIG. 8). In this case, if the projected object is the x-axis, y-axis or z-axis, the line segment connecting the maximum value and the minimum value among the coordinate values of the same axis at both end points of the ray (e.g., the x coordinate value if the projected object is the x-axis) becomes an image A. The projection method in a case where, the projected object is the plane involves, for example, investigating the points of intersection of the perpendicular from both end points of the ray toward the projected line, and assuming the line segment connecting the points located at its both ends as an image A (see FIG. 9).

Any one of contents is selected from the group i–1 giving a set of contents (step 304). Note that the group o is supposed to be a set of all contents set within the observation area. And an image B of a selected content projected onto the projected object is decided (step 305). A projection method in a case where the projected object is the line involves, like the above example, investigating the points of intersection of the perpendicular from the vertex of the selected content toward the projected line, and assuming the line segment connecting the points located around the outermost contour at its both ends as an image B. In this case, if the projected object is in particular the x-axis, y-axis or z-axis, the line segment connecting the maximum value and the minimum value among the vertex coordinate values of the same axis for the content (e.g., the x coordinate value if the projected object is the x-axis) becomes an image B.

A projection method in a case where the projected object is the plane involves, like the above example, investigating the points of intersection of the perpendicular from the vertex of the selected content toward the projected plane, and assuming the area connecting the points located around the outermost contour as an image B. After that, a determination is made whether or not the images A and B intersect (step 306). If they intersect, the procedure goes to step 308 to incorporate the content into the group i, or if not, the procedure proceeds to step 307 to exclude the selected content from the shield retrieval object. And if the selected content is the last content among the group i–1 (step 309), the procedure proceeds to step 310. If not, the procedure goes to step 312 to select the next unselected content among the group i–1, and then gets back to step 305 again.

At step 310, it is checked whether or not the value of i is beyond the number M of projected objects, and if so, the procedure proceeds to step 311. If not, the procedure goes to step 313 to increment the value of i by one, and then gets back to step 303. At step 311, for the content belonging to the group M, shield detection in the three dimensional space is practiced to calculate the reflecting or transmitting point specifically. Herein, the multiple variable equations are employed to detect the shield and detect the reflecting or transmitting point as described above.

To set the projected object i, the line is set as the projected object with the small value of i, and the plane is set as the projected object with the large value of i.

The operation of the embodiment of the invention as shown in FIG. 6 will be set forth with reference to FIGS. 7 to 10. FIG. 7 is a table showing an example of setting the projected object i in case of M=5. In FIG. 7, the line is set as the projected object with the small value of i, and the plane is set as the projected object with the large value of i. As the line, the x-axis, the y-axis and the z-axis are set up. As the plane, the xy plane and the zx plane are set up. In the exemplary operation as shown in FIG. 6, investigating the projected objects from 1 to 5 in order, as shown in FIG. 7, a comparison is made between the image of the content and the image of the ray to be investigated that are projected onto each projected object, whereby the contents included in the groups 1 to 5 are selected in order. The selection of the content for the group i is effected by comparing the image B of each content included in the group i−1 projected onto the projected object i and the image A of the ray to be investigated projected onto the projected object i. Note that the group o involves all the contents included in the observation area.

FIG. 8 is a view showing the way of projection for the projected object 1, which is the x-axis in case of i=1. Reference numeral 401 denotes a content, and 405 denotes the ray to be investigated. The point of intersection of the perpendicular from each vertex of the content 401 onto the x-axis 407 that is the projected object is obtained, and the line segment connecting the points located at both ends in the outermost contour is an image 404 of the content 401 projected onto the projected object 1.

On the other hand, the points of intersection of the perpendicular from both end points of the ray 405 onto the x-axis 407 that is the projected object are obtained, and the line segment connecting the points located at both ends is an image 406 of the ray 405 projected onto the projected object 1. If the images 404 and 406 are decided, it is checked whether or not both images intersect. In FIG. 8, since the images 404 and 406 do not intersect, the content 401 is removed from the contents included in the group 1, and excepted from the shield detection object.

Similarly, the above contents adding process are performed for other contents as defined in the group o, thereby effecting the selectively incorporating process for the contents in the group 1. Further, in the case of the projected objects 2 and 3 which are the y-axis and the z-axis, the above selectively incorporating process for the contents is performed.

Figure 9:
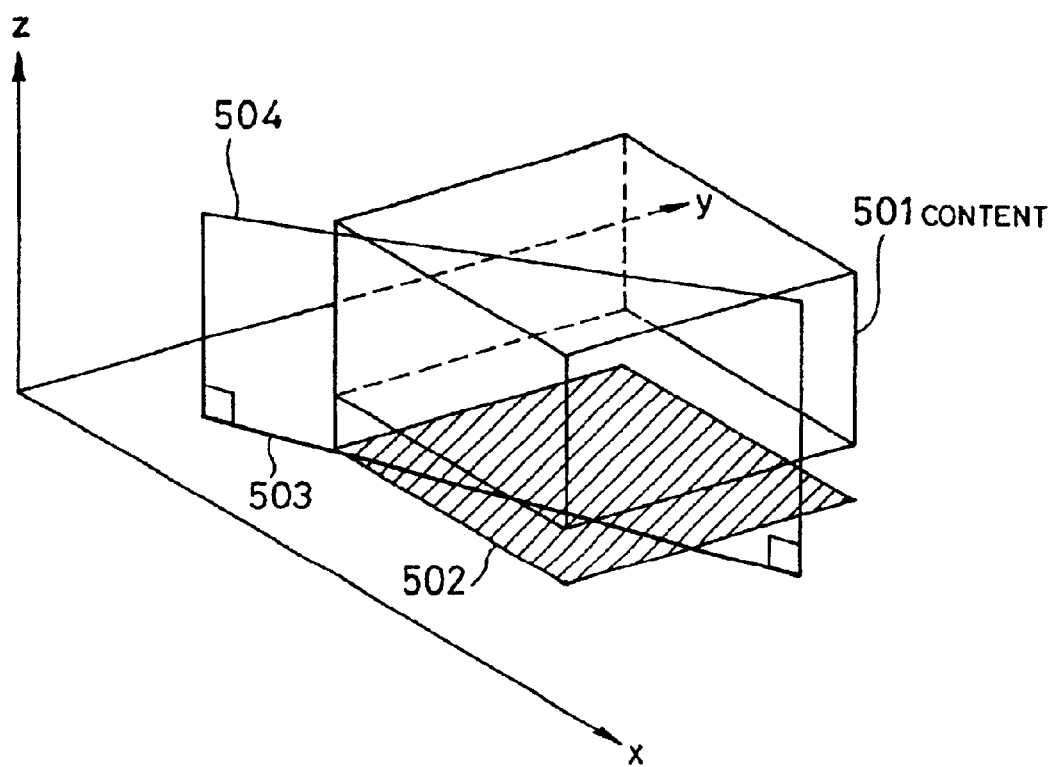
FIG. 9 is a view showing one example of projection when the projected object is an xy plane.

FIG. 9 is a view showing the way of projection when the projected object is the xy-plane as shown in FIG. 7, in the case of i=4. Reference numeral 501 denotes a content belonging to the group 3, and 504 denotes the ray to be investigated. The point of intersection of the perpendicular from each vertex of the content 501 onto the projected plane is investigated, and the area connecting the points located around the outermost contour is an image 502 of the content projected onto the projected object 4. The points of intersection of the perpendicular from both end points of the ray 504 onto the projected plane are investigated, and the line segment connecting the points located at both ends is an image 503 of the ray projected onto the projected object 4.

If the images 503 and 502 are decided, it is checked whether or not both images intersect. In FIG. 9, since the images 503 and 502 intersect, the content 501 is selected and incorporated as the content included in the group 4. Similarly, the above content adding process is performed for other contents selectively incorporated into the group 3, thereby effecting the selectively incorporating process for the contents in the group 4. Further, in case of the projected object 5 which is the zx-plane, the above selectively incorporating process for the contents is performed, making the selectively incorporating process of the contents in the group 5. The shield is detected in the three dimensional space for the contents included in the group 5, and ultimately, the shield through which the ray to be investigated passes is detected and the reflecting or transmitting point is decided.

FIG. 10 is a view showing how the contents are included in the group i in case of M=5. Reference numerals 606, 601, 602, 603, 604 and 605 denote the groups 0 to 5, respectively. By practicing the selectively incorporating process for the contents in each group, a size of the group is smaller as i is larger, and there is shown such a state where the contents as the shield detection object are concluded. Ultimately, it is required to solve the multiple variable equations to check whether or not the ray in the three dimensional space intersects the contents concluded in the group 5, as described previously. Depending on the result of calculation for the multiple variable equations, the reflecting or transmitting point of the contents for the ray to be investigated can be detected.

With the conventional method, the multiple variable equations must be solved for all the contents within the observation area, namely, all the contents included in the group 0 indicated by 606. However, with this invention, the multiple variable equations are only necessary to be solved for the contents concluded in the group 5 indicated by 605, resulting in the shorter processing time.

Figure 11:
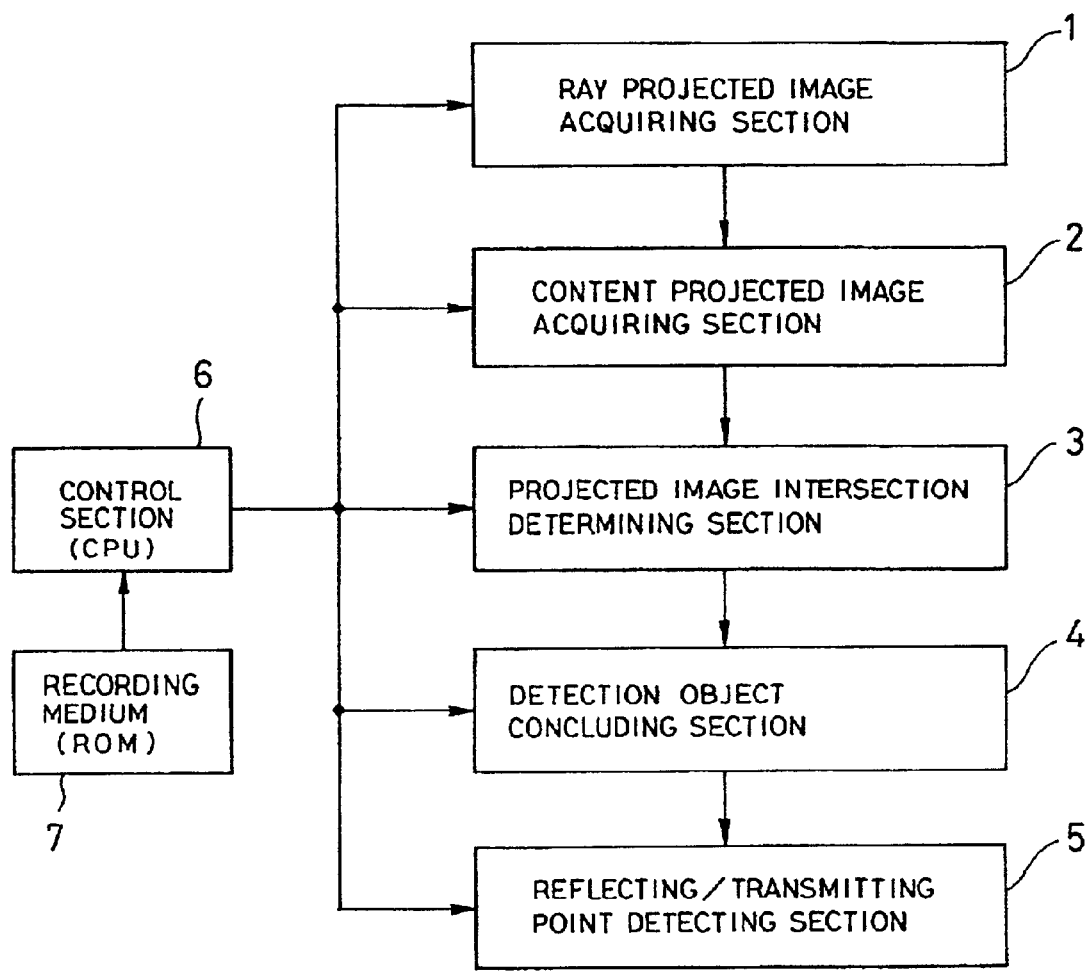
FIG. 11 is a schematic functional block diagram showing a configuration for making the ray launching processing.

A functional block diagram for implementing the processing operation of this embodiment as described above is shown in FIG. 11. In FIG. 11, a projected image acquiring section 1 has a function of acquiring an image A of the ray to be investigated onto the projected object i. Also, a projected image acquiring section 2 for the content has a function of selecting the content included in the group i−1 and acquiring an image B of the content projected onto the projected object i.

A projected image intersection determining section 3 has a function of determining whether or not the images A and B intersect, and a detection object concluding section 4 has a function of incorporating selectively the content into the group i, if it is determined by the projected image intersection determining section 3 that the images A and B intersect, or if not, excluding this content from the shield detection object.

A reflecting/transmitting point detecting section 5 has a function of performing the shield detecting process and the reflecting/transmitting point detecting process for the contents belonging to the group M concluded ultimately, by solving the multiple variable equations as mentioned earlier.

A control section 6 is composed of a CPU, and has a function of controlling the execution of an operation process as shown in FIG. 6 by reading an operation control program previously stored in a recording medium 7 such as a read-only-memory (ROM), and controlling each of the sections 1 to 5 in accordance with a control procedure of this program.

A way of setting up the projected object i (i is a sequence number of projection) will be set forth below. As one example, the line may be set to the projected object with small value of i, and the plane may be set to the projected object with large value of i, as shown in FIG. 7. That is, since the projection onto the line has a smaller amount of computation than the projection onto the plane, the processing amount is reduced if the content that is the shield detection object is concluded beforehand by the projection with the line.

Also, another way of setting up the projected object i involves variably setting the projected object depending on the value of t, such that there is a greater difference between t and T as i is smaller, supposing that the absolute value of the elevation angle of the ray to be investigated with respect to the predetermined plane is t, and the absolute value of the elevation angle of the projected object i with respect to the predetermined plane is T.

The reason will be described below. Since the observation area is typically finite, when the difference between the elevation angle of the ray to be investigated and the elevation angle of the projected object i is large, the image of the ray onto the projected object i has so small an occupying area that many contents without intersection can be detected. Accordingly, the projected object i is set such that the difference between t and T is greater as i is smaller, whereby the contents not intersecting the ray to be investigated can be excluded from the shield detection object at the early time, resulting in the reduced processing amount.

Figure 12:
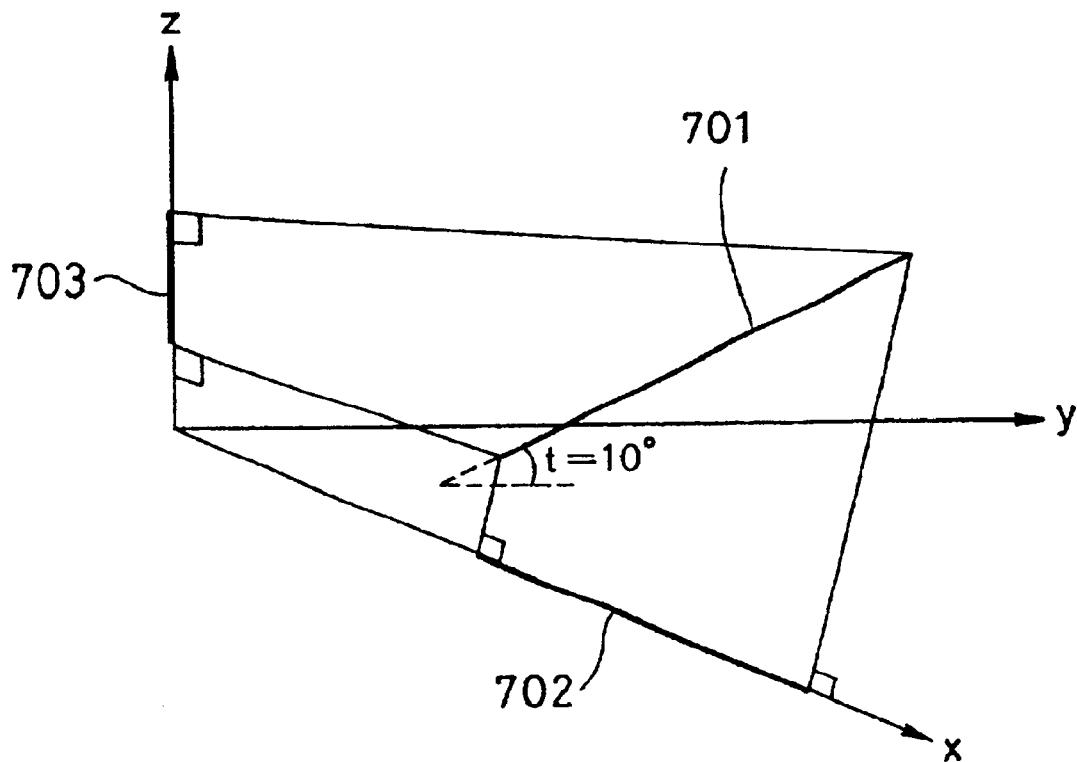
FIG. 12 is a view for explaining one example of a method of setting i of the projected object.

Referring to FIG. 12, to easily understand the setting of this projected object i, it is supposed that the xy-plane is taken as the predetermined plane, and the elevation angle t of the ray 701 to be investigated with respect to the xy-plane is 10 degrees. At this time, in the case where the projected objects are the x-axis and the z-axis, and the order i for both objects is set up, the elevation angle Tx of the x-axis with respect to the xy-plane is equal to 0 degree, and the elevation angle Tz of the z-axis with respect to the xy-plane is equal to 90 degrees. Accordingly, the difference between t and Tx and the difference between t and Tz are 10 degrees and 90 degrees, respectively, as shown in FIG. 12. Hence, in this embodiment, the projected object i is set to be smaller for the z-axis than the x-axis, so that the z-axis is selected earlier as the projected object than the x-axis.

It follows that an image 703 of a ray 701 to be investigated projected onto the z-axis that has a shorter length is set at a smaller value of i than an image 702 of the ray projected onto the x-axis.

According to the first embodiment of the present invention, the plural rays radiated from the transmitting point are divided and allocated to the CPUs, and the ray launching processing are performed simultaneously by all the CPUs, resulting in a shorter computation time. In the case where the CPUs have different processing capabilities, the CPU having higher processing capability (i.e., faster computation speed) can complete the ray launching processing faster. Or it takes a different time for the processing depending on the radiation angle of the ray. In the example as shown in FIG. 4 according to the second embodiment of the invention, the CPUs perform the ray launching processing successively in the order of CPU that has ended the processing earlier, whereby the CPU can be assigned the ray adaptively in accordance with the processing capability of the CPU and the entire processing can be completed in the minimum computation time.

Further, in the example with the priority as shown in FIG. 5 according to the second embodiment of the invention, since each CPU can arbitrarily set up the order of rays to perform the ray launching processing, for example, the priority of the ray at radiation angle which takes a longer time in computation may be set to be higher for the CPU having greater processing capability, and lower for the CPU having smaller processing capability, whereby the computation time per ray can be equalized.

What is claimed is:

1. A system for predicting radio wave propagation characteristics in which a plurality of contents, a transmitting point and a receiving point are provided in an observation space as defined within a three dimensional space, and the plural radio wave rays are radiated at different angles from said transmitting point, said rays being reflected or transmitted repetitively upon the collision with said plurality of contents as said rays proceed, and in which a ray launching processing for acquiring the information of the passage time and the intensity of said ray at the time of passing in the vicinity of said receiving point is performed while said ray is being reflected or transmitted repetitively, comprising:
    a plurality of CPUs (Central Processing Units) that are interconnected via a network,
    wherein said plural rays radiated from said transmitting point are divided into a plurality of groups, each group being allocated to a different CPU, and said ray launching processing is performed for all the allocated rays independently and simultaneously by said plurality of CPUs.

2. The system for predicting radio wave propagation characteristics according to claim 1,
    wherein to detect a shield shielding a ray among a plurality of said contents in the ray launching processing, each of said CPUs comprises:
        first image acquiring means for acquiring a first image of said ray projected onto a projected object preset within said observation space;
        second image acquiring means for acquiring a second image of each of said contents projected onto said projected object,
        determination means for determining whether or not said first image and said second image intersect each other, and
        detection object concluding means for concluding a corresponding content as the shield detection object for said ray, in the case where the result of determination indicates the intersection.

3. The system for predicting radio wave propagation characteristics according to claim 2,
    wherein each of said CPUs further comprises control means for controlling the execution of said first image acquiring means, said second image acquiring means, said determination means and said detection object concluding means, such that the M projected objects (M is an integer of 2 or greater) are set up, said first image acquiring means, said second image acquiring means, said determination means and said detection object concluding means are controlled for execution for a projected object i=1 (i is from 1 to M), then for contents concluded by said detection object concluding means, said first image acquiring means, said second image acquiring means, said determination means and said detection object concluding means are controlled for execution for a projected object i=2, and the same control for execution is repeated till a projected object i=M.

4. The system for predicting radio wave propagation characteristics according to claim 3,
    wherein supposing that said projected object i is a line or a plane as defined in the three dimensional space, different lines or planes are assigned to said projected objects.

5. The system for predicting radio wave propagation characteristics according to claim 4,
    wherein the line is assigned to each of the projected objects i=1 to L (L is an integer such as $2 \leq L < M$), and the plane is assigned to each of the projected objects i=L+1 to M.

6. The system for predicting radio wave propagation characteristics according to claim 3,
   wherein the projected object i is set at a smaller value as the length of the ray projected onto said projected object is smaller.

7. The system for predicting radio wave propagation characteristics according to claim 6,
   wherein supposing that the absolute value of an elevation angle of said ray with respect to a predetermined plane is t, and the absolute value of an elevation angle of said projected object with respect to the predetermined plane is T, said projected object is variably set in accordance with the value of t, and the projected object i is set such that there is a greater difference between t and T for smaller i.

8. The system for predicting radio wave propagation characteristics according to claim 1,
   wherein to detect a shield shielding a ray among a plurality of said contents in the ray launching processing, each of said CPUs comprises:
       means for acquiring an image A of said ray projected onto a projected object i, in which a plurality of projected objects i (i=1 to M: M is an integer of 2 or greater) are set up within said observation space, a group k (k=0 to M) representing part or all of the contents is defined, and a group o is a set of all the contents as defined within said observation space;
       means for selecting one content from the group i−1 and acquiring an image B of said content projected onto said projected object i,
       means for practicing a selectively incorporating process by checking whether or not said images A and B intersect, and selectively incorporating said content into the group i if said images A and B intersect,
       means for practicing the selectively incorporating process of the contents included in the group i by practicing the selectively incorporating process for each of all other contents in the group i−1, and
       means for detecting the shield for the contents included in a group M and concluded ultimately by practicing the selectively incorporating process of the contents for i=1 to M in sequence.

9. A system for predicting radio wave propagation characteristics in which a plurality of contents, a transmitting point and a receiving point are provided in an observation space as defined within a three dimensional space, and the plural radio wave rays are radiated at different angles from said transmitting point, said rays being reflected or transmitted repetitively upon the collision with said plurality of contents as said rays proceed, and in which a ray launching processing for acquiring the information of the passage time and the intensity of said ray at the time of passing in the vicinity of said receiving point is performed while said ray is being reflected or transmitted repetitively, comprising:
   a plurality of CPUs (Central Processing Units) that are interconnected via a network; and
   a recording device that can be accessed from each of all the CPUs,
   wherein each of said plural rays radiated from said transmitting point has a respective priority set, each of said CPUs is assigned one ray in the order of higher priority, and said ray launching processing is performed for the assigned rays simultaneously by the plurality of CPUs,
   wherein the ray with the next priority that has not yet been assigned to the CPU is selected in the order of the CPUs that have ended said ray launching processing, said CPU performing said ray launching processing for the selected ray, and an indicator for indicating that said selected ray is processed by said CPU is recorded into said recording device, and
   wherein a ray selecting process of selecting the ray by referring to said recording device and the ray launching processing are repeatedly performed until the last ray is reached.

10. The system for predicting radio wave propagation characteristics according to claim 9, wherein said priority of the ray having a longer processing time for the ray launching processing is set to be higher in the CPU of greater processing capability and lower in the CPU of smaller processing capability.

11. A system for predicting radio wave propagation characteristics in which a plurality of contents, a transmitting point and a receiving point are provided in an observation space as defined within a three dimensional space, and the plural radio wave rays are radiated at different angles from said transmitting point, said rays being reflected or transmitted repetitively upon the collision with said plurality of contents as said rays proceed, and in which a ray launching processing for acquiring the information of the passage time and the intensity of said ray at the time of passing in the vicinity of said receiving point is performed while said ray is being reflected or transmitted repetitively, comprising:
   a plurality of CPUs (Central Processing Units) that are interconnected via a network;
   a recording device that can be accessed from all the CPUs, and
   a priority table set up for each of said CPUs and indicating a priority of each of the plural rays radiated from said transmitting point, said priority table being different for each of said CPUs,
   wherein the ray having the highest priority is selected from among the rays for which the lay launching processing has not yet been performed by said CPUs by referring to said priority table provided for each of said CPUs, and each of said CPUs performs the lay launching processing for said selected ray, in which the ray launching processing is performed simultaneously by all the CPUs,
   wherein each of said CPUs records an indicator for indicating that the ray launching processing is performed for the ray in said recording device, and each of said CPUs grasps whether or not the ray launching processing has been performed for a certain ray by referring to said recording device, and
   wherein each of said CPUs performs repetitively a ray assignment processing and the ray launching processing for the ray until the last ray is reached.

12. A method of predicting radio wave propagation characteristics in which a plurality of contents, a transmitting point and a receiving point are provided in an observation space as defined within a three dimensional space, and the plural radio wave rays are radiated at different angles from said transmitting point, said rays being reflected or transmitted repetitively upon the collision with said plurality of contents as said rays proceed, and in which a ray launching processing for acquiring the information of the passage time and the intensity of said ray at the time of passing in the vicinity of said receiving point is performed while said ray is being reflected or transmitted repetitively, comprising the steps of:
   dividing the plural rays radiated from said transmitting point into a plurality of groups, and allocating each group to a different CPU; and performing said ray launching processing for all the allocated rays independently and simultaneously by said plurality of CPUs.

13. The method of predicting radio wave propagation characteristics according to claim 12,
wherein to detect a shield shielding a ray among a plurality of contents in the ray launching processing, comprising, in each of said CPUs:
a first step of acquiring a first image of said ray projected onto a projected object preset within said observation space;
a second step of acquiring a second image of each of said contents projected onto said projected object;
a third step of determining whether or not said first image and said second image intersect each other; and
a fourth step of concluding a corresponding content as the shield detection object for said ray, in the case where the result of determination indicates the intersection.

14. The method of predicting radio wave propagation characteristics according to claim 13,
wherein the M projected objects (M is an integer of 2 or greater) are set up, said first to fourth steps are executed for a projected object i=1 (i is from 1 to M), then for a content concluded at said fourth step, said first to fourth steps are executed for a projected object i=2, and the same processing is repeated till a projected object i=M.

15. The method of predicting radio wave propagation characteristics according to claim 14,
wherein supposing that said projected object i is a line or a plane as defined in the three dimensional space, different lines or planes are assigned to said projected objects.

16. The method of predicting radio wave propagation characteristics according to claim 15,
wherein the line is assigned to each of the projected objects i=1 to L (L is an integer such as 2≦L<M), and the plane is assigned to each of the projected objects i=L+1 to M.

17. The method of predicting radio wave propagation characteristics according to claim 14,
wherein the projected object i is set at a smaller value as the length of the ray projected onto said projected object is smaller.

18. The method of predicting radio wave propagation characteristics according to claim 17,
wherein supposing that the absolute value of an elevation angle of said ray with respect to a predetermined plane is t, and the absolute value of an elevation angle of said projected object with respect to the predetermined plane is T, said projected object is variably set in accordance with the value of t, and the projected object i is set such that there is a greater difference between t and T for smaller i.

19. The method of predicting radio wave propagation characteristics according to claim 12,
wherein to detect a shield shielding a ray among a plurality of contents in the ray launching processing, said method comprises, in each of said CPUs:
a step of acquiring an image A of said ray projected onto a projected object i, in which a plurality of projected objects i (i=1 to M: M is an integer of 2 or greater) are set up within said observation space, a group k (k=0 to M) representing part or all of the contents is defined, and a group o is a set of all the contents as defined within said observation space;

a step of selecting one content from the group i–1 and acquiring an image B of said content projected onto said projected object i;
a step of practicing a selectively incorporating process by checking whether or not said images A and B intersect, and selectively incorporating said content into the group i if said images A and B intersect;
a step of practicing the selectively incorporating process of the contents included in the group i by practicing the selectively incorporating process for each of all other contents in the group i–1; and
a step of detecting the shield for the contents included in a group M and concluded ultimately by practicing the selectively incorporating process of the contents for i=1 to M in sequence.

20. A method of predicting radio wave propagation characteristics in which a plurality of contents, a transmitting point and a receiving point are provided in an observation space as defined within a three dimensional space, and the plural radio wave rays are radiated at different angles from said transmitting point, said rays being reflected or transmitted repetitively upon the collision with said plurality of contents as said rays proceed, and in which a ray launching processing for acquiring the information of the passage time and the intensity of said ray at the time of passing in the vicinity of said receiving point is performed while said ray is being reflected or transmitted repetitively, comprising the steps of:
setting said plural rays radiated from said transmitting point with respective priorities, and assigning each of said CPUs with one ray in the order of higher priority;
performing said ray launching processing for the assigned rays simultaneously by said plurality of CPUs;
selecting the ray with the next priority that has not been assigned to the CPU in the order of said CPUs that have ended said ray launching processing, each of said CPUs performing said ray launching processing for the selected ray; and
recording an indicator for indicating that said selected ray is processed in said CPU into said recording device, in which a ray selecting process for selecting said ray by referring to said recording device and the ray launching processing are repeatedly performed until the last ray is reached.

21. The method of predicting radio wave propagation characteristics according to claim 20,
wherein said priority of the ray having a longer processing time for the ray launching processing is set to be higher in the CPU of greater processing capability and lower in the CPU of smaller processing capability.

22. A method of predicting radio wave propagation characteristics in which a plurality of contents, a transmitting point and a receiving point are provided in an observation space as defined within a three dimensional space, and the plural radio wave rays are radiated at different angles from said transmitting point, said rays being reflected or transmitted repetitively upon the collision with said plurality of contents as said rays proceed, and in which a ray launching processing for acquiring the information of the passage time and the intensity of said ray at the time of passing in the vicinity of said receiving point is performed while said ray is being reflected or transmitted repetitively, comprising the steps of:
setting up a priority table for each of said CPUs and indicating a priority of each of the plural rays radiated from said transmitting point, said priority table being different for each of said CPUs; and selecting the ray having the highest priority from among the rays for which the lay launching processing has not yet been performed by said CPUs by referring to said priority table provided for each of said CPUs, wherein each of said CPUs performs the lay launching processing for said selected ray, in which the ray launching processing is simultaneously by all the CPUs, each of said CPUs records an indicator for indicating that the ray launching processing is performed for the ray into said recording device, and each of said CPUs grasps whether or not the ray launching processing has been performed for a certain ray by referring to said recording device, in which each of said CPUs performs repetitively an assignment processing and the ray launching processing for the ray until the last ray is reached.

23. A recording medium for recording a program for enabling a computer to execute a method of predicting radio wave propagation characteristics in which a plurality of contents, a transmitting point and a receiving point are provided in an observation space as defined within a three dimensional space, and plural radio wave rays are radiated at different angles from said transmitting point, said rays being reflected or transmitted repetitively upon the collision with said plurality of contents as said rays proceed, and in which a ray launching processing for acquiring the information of the passage time and the intensity of said ray at the time of passing in the vicinity of said receiving point is performed while said ray is being reflected or transmitted repetitively, wherein said program comprises the steps of:

dividing the plural rays radiated from said transmitting point into a plurality of groups, and allocating each group to a different CPU; and performing said ray launching processing for all the allocated rays independently and simultaneously by said plurality of CPUs.

24. The recording medium according to claim 23, wherein to detect a shield shielding a ray among a plurality of contents in the ray launching processing, said program comprises, in each of said CPUs:

a first step of acquiring a first image of said ray projected onto a projected object preset within said observation space;

a second step of acquiring a second image of each of said contents projected onto said projected object;

a third step of determining whether or not said first image and said second image intersect each other; and a fourth step of concluding a corresponding content as the shield detection object for said ray, in the case where the result of determination indicates the intersection.

25. The recording medium according to claim 24, wherein the M projected objects (M is an integer of 2 or greater) are set up, said first to fourth steps are executed for a projected object i=1 (i is from 1 to M), then for a content concluded at said fourth step, said first to fourth steps are executed for a projected object i=2, and the same processing is repeated till a projected object i=M.

26. The recording medium for recording the program according to claim 25, wherein supposing that said projected object i is a line or a plane as defined in the three dimensional space, different lines or planes are assigned to said projected objects.

27. The recording medium for recording the program according to claim 26, wherein the line is assigned to each of the projected objects i=1 to L (L is an integer such as $2 \leq L<M$), and the plane is assigned to each of the projected objects i=L+1 to M.

28. The recording medium for recording the program according to claim 25, wherein the projected object i is set at a smaller value as the length of the ray projected onto said projected object is smaller.

29. The recording medium for recording the program according to claim 28, wherein supposing that the absolute value of an elevation angle of said ray with respect to a predetermined plane is t, and the absolute value of an elevation angle of said projected object with respect to the predetermined plane is T, said projected object is variably set in accordance with the value of t, and the projected object i is set such that there is a greater difference between t and T for smaller i.

30. The recording medium according to claim 23, wherein to detect a shield shielding a ray among a plurality of contents in the ray launching processing, said program comprises, in each of said CPUs:

a step of acquiring an image A of said ray projected onto a projected object i, in which a plurality of projected objects i (i=1 to M: M is an integer of 2 or greater) are set up within said observation space, a group k (k=0 to M) representing part or all of the contents is defined, and a group o is a set of all the contents as defined within said observation space;

a step of selecting one content from the group i–1 and acquiring an image B of said content projected onto said projected object i;

a step of practicing a selectively incorporating process by checking whether or not said images A and B intersect, and selectively incorporating said content into the group i if said images A and B intersect;

a step of practicing the selectively incorporating process of the contents included in the group i by practicing the selectively incorporating process for each of all other contents in the group i–1; and a step of detecting the shield for the contents included in a group M and concluded ultimately by practicing the selectively incorporating process of the contents for i=1 to M in sequence.

31. A recording medium for recording a program for enabling a computer to execute a method of predicting radio wave propagation characteristics in which a plurality of contents, a transmitting point and a receiving point are provided in an observation space as defined within a three dimensional space, and the plural radio wave rays are radiated at different angles from said transmitting point over said observation space, said rays being reflected or transmitted repetitively upon the collision with said plurality of contents as said rays proceed, and in which a ray launching processing for acquiring the information of the passage time and the intensity of said ray at the time of passing in the vicinity of said receiving point is performed while said ray is being reflected or transmitted repetitively, wherein said program comprises the steps of:

setting said plural rays radiated from said transmitting point with respective priorities, and assigning each of said CPUs with one ray in the order of higher priority;

performing said ray launching processing for the assigned rays simultaneously by said plurality of CPUs;

selecting the ray with the next priority that has not yet been assigned to the CPU in the order of said CPUs that have ended said ray launching processing, each of said CPUs performing said ray launching processing for the selected ray; and recording an indicator for indicating that said selected ray is processed by said CPU into said recording device, in which a ray selecting process for selecting said ray by referring to said recording device and the ray launching processing are repeatedly performed until the last ray is reached.

32. The recording medium according to claim 31, wherein said priority of the ray having a longer processing time for the ray launching processing is set to be higher in the CPU of greater processing capability and lower in the CPU of smaller processing capability.

33. A recording medium for recording a program for enabling a computer to execute a method of predicting radio wave propagation characteristics in which a plurality of contents, a transmitting point and a receiving point are provided in an observation space as defined within a three dimensional space, and the plural radio wave rays are radiated at different angles from said transmitting point over said observation space, said rays being reflected or transmitted repetitively upon the collision with said plurality of contents as said rays proceed, and in which a ray launching processing for acquiring the information of the passage time and the intensity of said ray at the time of passing in the vicinity of said receiving point is performed while said ray is being reflected or transmitted repetitively, wherein said program comprises the steps of:

setting up a priority table for each of said CPUs and indicating a priority of each of the plural rays radiated from said transmitting point, said priority table being different for each of said CPUs;

selecting a ray having the highest priority from among the rays for which the lay launching processing has not yet been performed by said CPUs by referring to said priority table provided for each of said CPUs, each of said CPUs performing the lay launching processing for said selected ray; and performing the ray launching processing simultaneously by all the CPUs, each of said CPUs recording an indicator for indicating that the ray launching processing is performed for the ray in said recording device; and grasping whether or not the ray launching processing has been performed for a certain ray by referring to said recording device in each of said CPUs, whereby each of said CPUs performs repetitively the assignment processing and the ray launching processing for the ray until the last ray is reached.

* * * * *